US011904969B2

(12) United States Patent
Davis

(10) Patent No.: US 11,904,969 B2
(45) Date of Patent: Feb. 20, 2024

(54) SHIELDING CANOPY ASSEMBLY

(71) Applicant: Bernice Davis, Los Angeles, CA (US)

(72) Inventor: Bernice Davis, Los Angeles, CA (US)

( * ) Notice: Subject to any disclaimer, the term of this patent is extended or adjusted under 35 U.S.C. 154(b) by 448 days.

(21) Appl. No.: 17/219,937

(22) Filed: Apr. 1, 2021

(65) Prior Publication Data

US 2022/0315151 A1 Oct. 6, 2022

(51) Int. Cl.
*B62J 17/083* (2020.01)
*B62J 7/04* (2006.01)

(52) U.S. Cl.
CPC .............. *B62J 17/083* (2020.02); *B62J 7/04* (2013.01)

(58) Field of Classification Search
CPC ................................. B62J 17/083; B62J 17/04
See application file for complete search history.

(56) References Cited

U.S. PATENT DOCUMENTS

| | | | |
|---|---|---|---|
| 1,342,987 A * | 6/1920 | Chimino | B62J 17/08 296/78.1 |
| 4,045,077 A | 8/1977 | DeVine | |
| 4,560,196 A * | 12/1985 | Carter, Sr. | B62J 17/08 296/102 |
| 5,975,614 A * | 11/1999 | McGrue | B62J 17/08 296/78.1 |
| 6,227,557 B1 | 5/2001 | Perret | |
| 7,690,390 B2 | 4/2010 | Hopkins | |
| 7,896,014 B1 | 3/2011 | Chiang | |
| D682,747 S | 5/2013 | McAlister | |
| 9,586,640 B1 | 3/2017 | Scott | |
| 10,480,208 B1 * | 11/2019 | Rogers | E04H 15/48 |
| 2008/0048413 A1 * | 2/2008 | Salinas | B62J 17/08 135/88.03 |
| 2010/0200033 A1 * | 8/2010 | Forester | B62J 17/08 403/167 |
| 2018/0072164 A1 * | 3/2018 | Plesniak | B60L 53/00 |
| 2020/0332550 A1 * | 10/2020 | Rapp | E04H 6/04 |

FOREIGN PATENT DOCUMENTS

WO WO2009045231 4/2009

* cited by examiner

*Primary Examiner* — Noah Chandler Hawk

(57) ABSTRACT

A shielding canopy assembly for a bicycle includes a pair of first rods, a plurality of second rods, and a panel, which is substantially water impermeable. The panel and each second rod are coupled to and extend between the first rods, which are arcuate, to define an arch. Each of a pair of first couplers is coupled to a front end of a respective first rod. The first couplers are configured to couple to a handlebar of a bicycle to couple the pair of first rods to the handlebar. Each of a pair of second couplers is coupled to a rear end of a respective first rod. The second couplers are configured to couple to the bicycle, behind a seat of the bicycle, so that the arch is disposed over a rider who is positioned on the seat. The panel is configured to shield the rider from the elements.

18 Claims, 6 Drawing Sheets

SHIELDING CANOPY ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to canopy assemblies and more particularly pertains to a new canopy assembly for a bicycle.

BRIEF SUMMARY OF THE INVENTION

An embodiment of the disclosure meets the needs presented above by generally comprising a pair of first rods, a plurality of second rods, and a panel, which is substantially water impermeable. The panel and each second rod are coupled to and extend between the first rods, which are arcuate, to define an arch. Each of a pair of first couplers is coupled to a front end of a respective first rod. The first couplers are configured to couple to a handlebar of a bicycle to couple the pair of first rods to the handlebar. Each of a pair of second couplers is coupled to a rear end of a respective first rod. The second couplers are configured to couple to the bicycle, behind a seat of the bicycle, so that the arch is disposed over a rider who is positioned on the seat. The panel is configured to shield the rider from the elements.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

Figure 3:
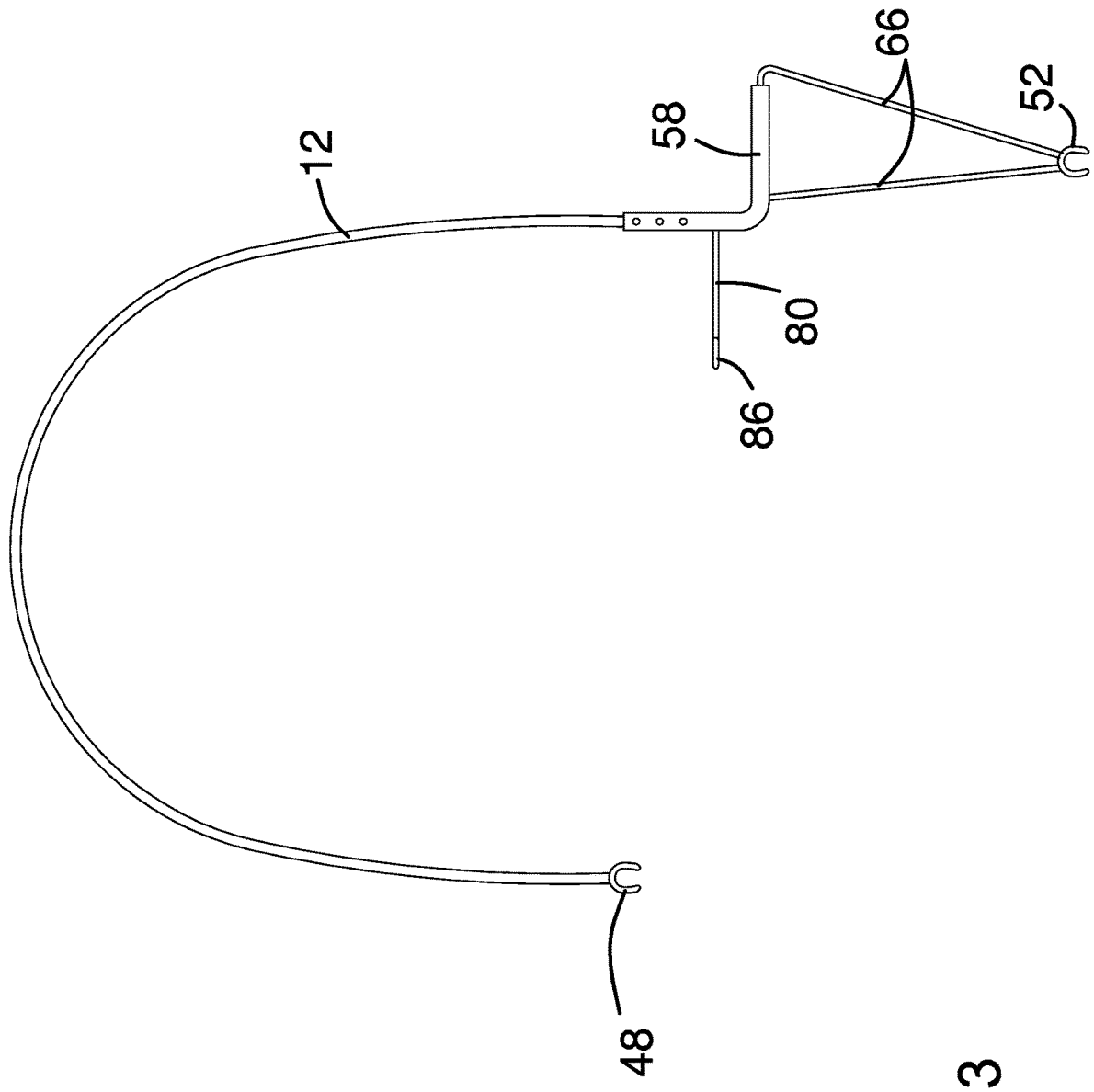
Figure 4:
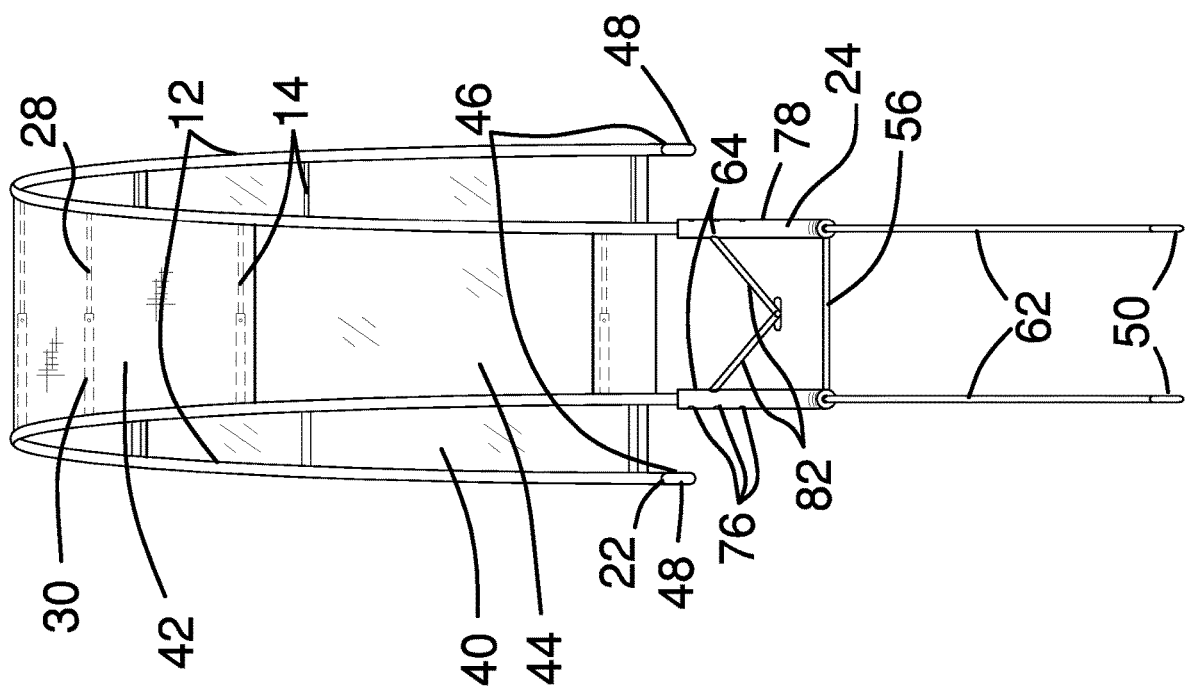
Figure 5:
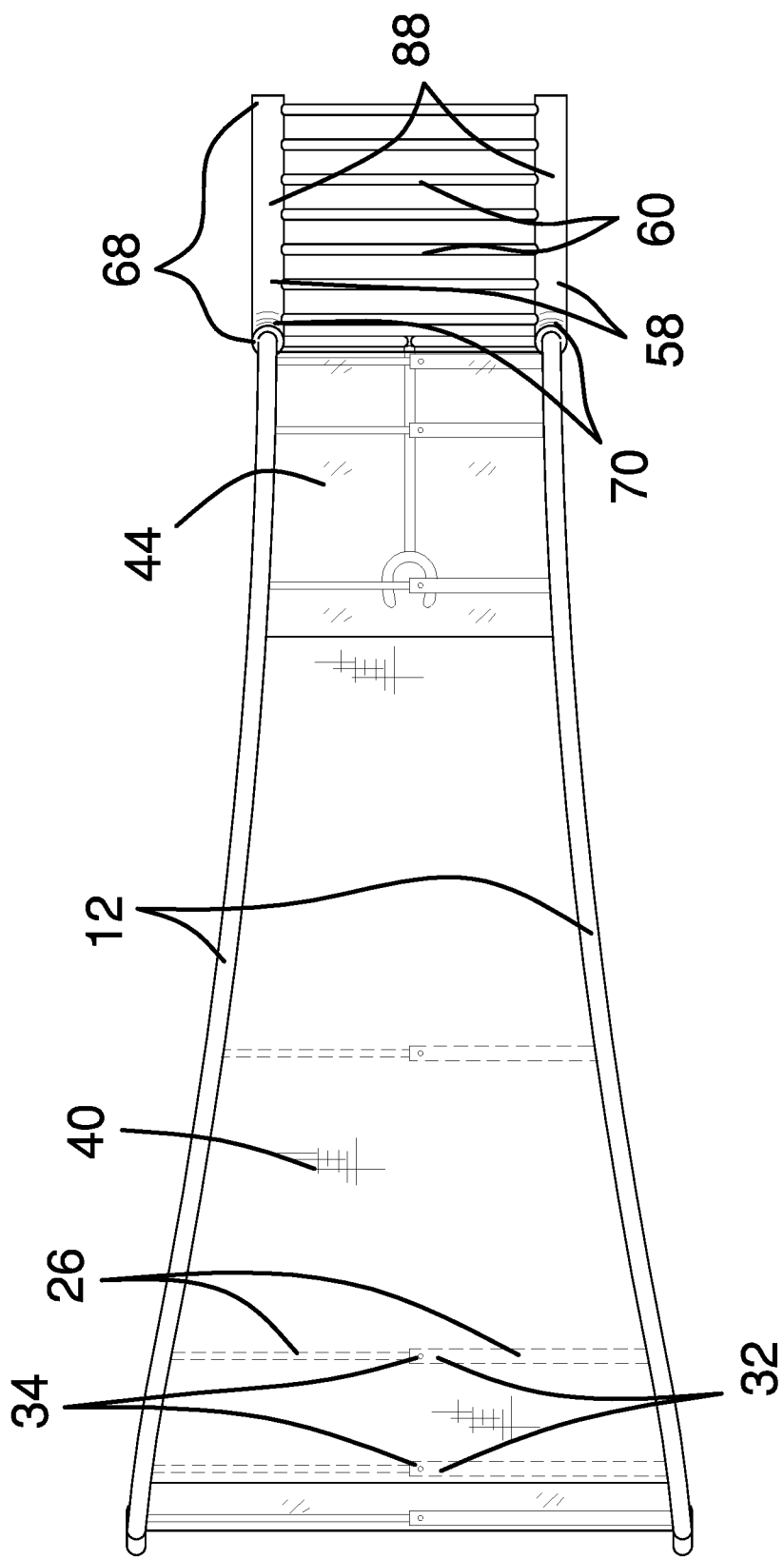
Figure 6:
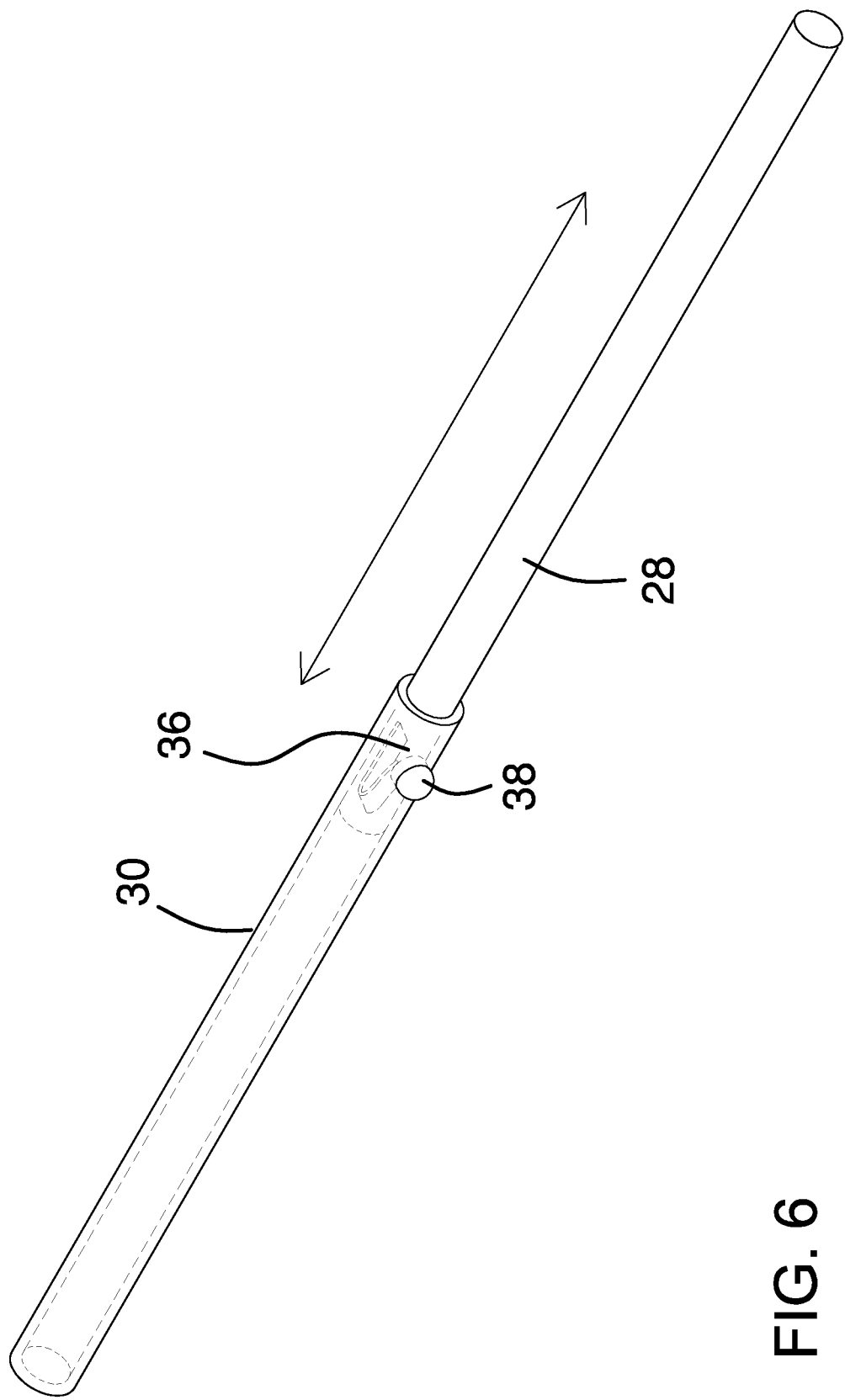

FIG. 3 is a side view of an embodiment of the disclosure.
FIG. 4 is a rear view of an embodiment of the disclosure.
FIG. 5 is a top view of an embodiment of the disclosure.
FIG. 6 is a detail view of an embodiment of the disclosure.

DETAILED DESCRIPTION OF THE INVENTION

With reference now to the drawings, and in particular to FIGS. 1 through 6 thereof, a new canopy assembly embodying the principles and concepts of an embodiment of the disclosure and generally designated by the reference numeral 10 will be described.

Figure 1:
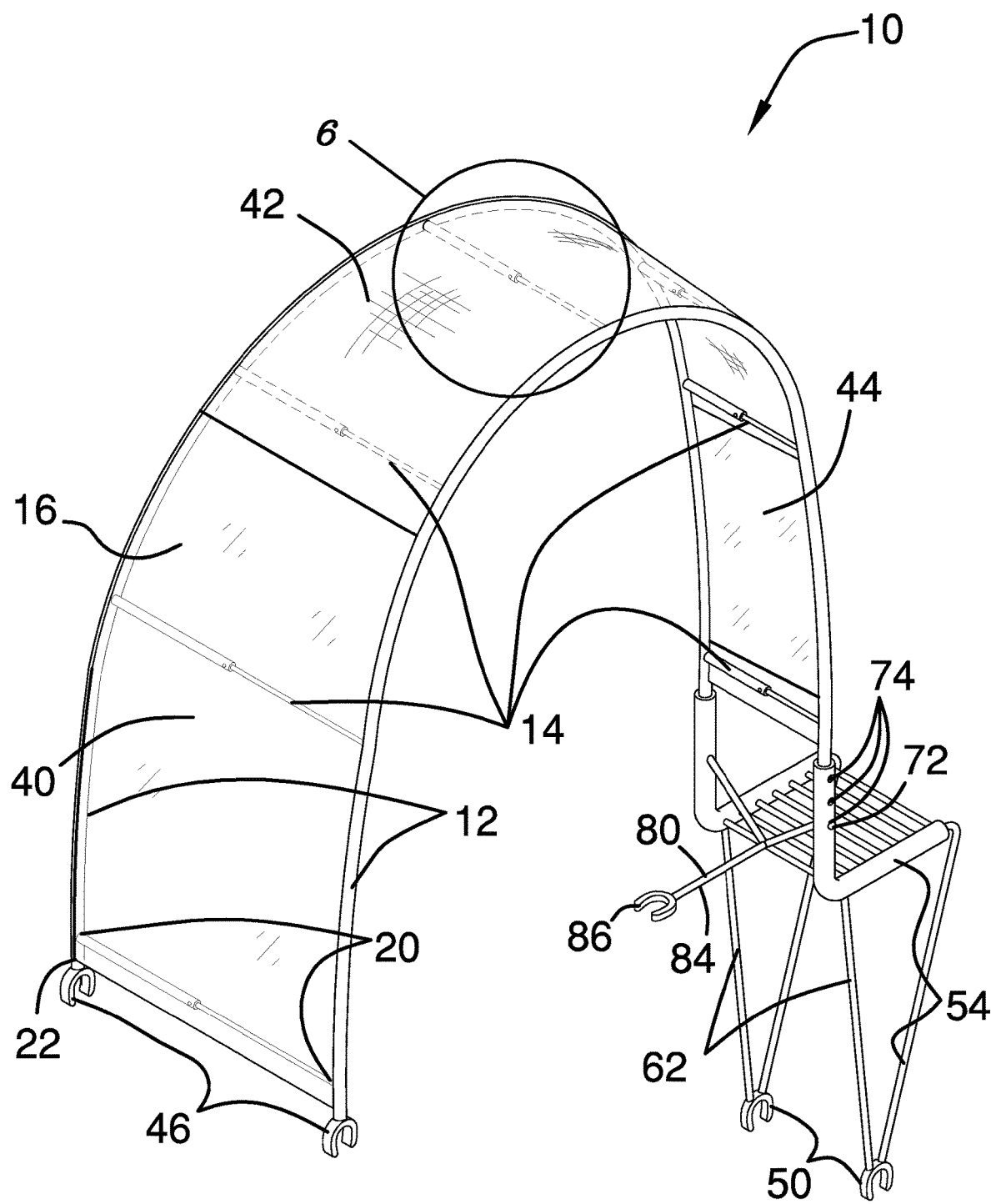
FIG. 1 is an isometric perspective view of a shielding canopy assembly according to an embodiment of the disclosure.

As best illustrated in FIGS. 1 through 6, the shielding canopy assembly 10 generally comprises a pair of first rods 12, a plurality of second rods 14, and a panel 16. Each first rod 12 is arcuate, tubular, and comprises plastic, or the like. The panel 16 and each second rod 14 are coupled to and extend between the first rods 12, which are arcuate, to define an arch 18, as shown in FIG. 1. Each second rod 14 has a respective length 20 so that the plurality of second rods 14 comprises second rods 14 that have a variety of lengths 20. The second rods 14 are positioned on the pair of first rods 12 so that front ends 22 of the pair of first rods 12 are further separated than rear ends 24, as shown in FIG. 4.

The plurality of second rods 14 comprises aluminum, or the like. Each second rod 14 comprises a plurality of nested sections 26 so that the second rod 14 is selectively extensible. The plurality of nested sections 26 is selectively positionable in an extended configuration so that the first rods 12 are distally disposed. The plurality of nested sections 26 also is selectively positionable in a retracted configuration so that the first rods 12 are proximally disposed. The plurality of nested sections 26 comprises an inner segment 28 that is selectively extensible from an outer segment 30, as shown in FIG. 6.

Each of a plurality of first connectors 32 is coupled to a respective inner segment 28 distal from an associated first rod 12 to which the inner segment 28 is coupled. Each of a plurality of second connectors 34 is coupled to a respective outer segment 30 distal from an associated first rod 12 to which the respective outer segment 30 is coupled. The second connector 34 is complementary to a first connector 32 of an associated inner segment 28. The second connector 34 is positioned to selectively couple to the first connector 32 to fixedly position the respective outer segment 30 relative to the associated inner segment 28 so that the plurality of nested sections 26 is fixedly positioned in the extended configuration.

The second connector 34 comprises a hole 36, and the first connector 32 comprises a segment pin 38, which is spring-loaded, as shown in FIG. 6. The segment pin 38 is positioned to insert into the hole 36 to couple the respective outer segment 30 to the associated inner segment 28.

The panel 16 comprises a front section 40, a medial section 42, and a rear section 44. The front section 40 and the rear section 44 are substantially transparent and are configured to allow the rider to see through the panel 16. The panel 16 comprises at least one of an aliphatic polyamide, a semi-aromatic polyamide, and a polyester, such as polyethylene terephthalate or the like, so that the panel 16 is substantially water impermeable.

Each of a pair of first couplers 46 is coupled to a front end 22 of a respective first rod 12. The first couplers 46 are configured to couple to a handlebar of a bicycle to couple the pair of first rods 12 to the handlebar. Each first coupler 46 comprises a handlebar clamp 48, which is C-shaped. The handlebar clamp 48 is configured to insert the handlebar so that the handlebar clamp 48 is frictionally coupled to the handlebar, as shown in 2.

Each of a pair of second couplers 50 is coupled to the rear end 24 of a respective first rod 12. The second couplers 50 are configured to couple to the bicycle, behind a seat of the bicycle, so that the arch 18 is disposed over a rider who is positioned on the seat and so that the panel 16 is configured to shield the rider from the elements, such as rain and ultraviolet radiation. Each second coupler 50 comprises an axle clamp 52, which is C-shaped. The axle clamp 52 is configured to insert a respective rear wheel coupler of the bicycle so that the axle clamp 52 is frictionally coupled to the respective rear wheel coupler, as shown in 2.

Figure 2:
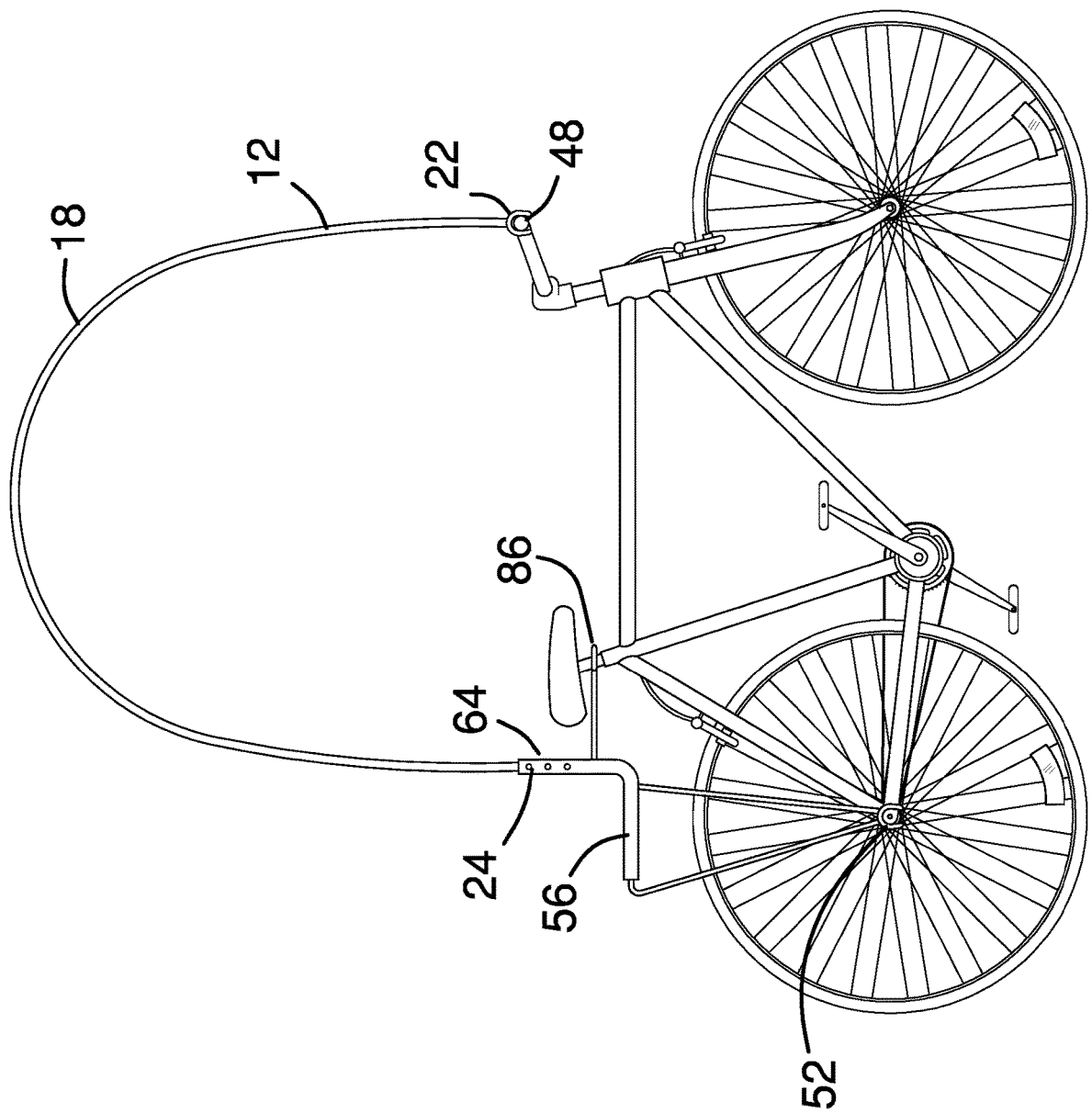
FIG. 2 is an in-use view of an embodiment of the disclosure.

A rack 54 is coupled to and positioned between the pair of second couplers 50 and the pair of first rods 12 so that a horizontal section 56 of the rack 54 is positioned over a rear wheel of the bicycle, as shown in FIG. 2. The horizontal section 56 is positioned to stow the pair of first rods 12, the plurality of second rods 14, and the panel 16. The horizontal section 56 comprises a pair of side bars 58 and a plurality of crossbars 60. Each crossbar 60 is coupled to and extends between the side bars 58.

The rack 54 also comprises a pair of brackets 62 and a pair of tubes 64. Each bracket 62 is coupled to and extends between a respective opposing side 88 of the horizontal section 56 and an associated second coupler 50. Each bracket 62 comprises a pair of bars 66, each of which is coupled to and extends transversely between a respective opposing end 68 of the horizontal section 56 and an associated second coupler 50. Each tube 64 is coupled to and extends perpendicularly from a respective front corner 70 of the horizontal section 56. The tube 64 is positioned to insert a respective first rod 12 to couple the respective first rod 12 to the rack 54.

Each of a pair of first fasteners 72 is coupled to a respective first rod 12 proximate to the front end 22 of the respective first rod 12. Each of a pair of second fasteners 74 is coupled to a respective tube 64. The second fasteners 74 are complementary to the first fasteners 72. Each second fastener 74 is positioned to selectively couple to an associated first fastener 72 to removably couple the pair of first tubes 64 to the rack 54. Each second fastener 74 comprises a plurality of orifices 76. Each first fastener 72 comprises a rod pin 78. The rod pin 78 is positioned to be selectively inserted into a respective orifice 76 to selectively position the arch 18 relative to a head of the rider. Thus, the assembly 10 can be selectively sized to fit the rider.

A horizontal rod 80 is coupled to and extends from the rack 54 toward a seat post of the bicycle. The horizontal rod 80 comprises a pair of first sections 82 and a second section 84. Each first section 82 is coupled to and extends transversely from a respective tube 64. The second section 84 is coupled to each of the first sections 82 distal from the pair of tubes 64 so that the pair of first sections 82 is V-shaped.

A post clamp 86 is coupled to the horizontal rod 80 distal from the rack 54. The post clamp 86 is C-shaped and is configured to insert the seat post of the bicycle so that the post clamp 86 is frictionally coupled to the seat post. The horizontal rod 80 is configured to stabilize the rack 54, as shown in FIG. 2.

In use, the rack 54 is coupled to the rear wheel couplers of the bicycle using the axle clamps 52, and to the seat post of the bicycle using the post clamp 86, so that the horizontal section 56 of the rack 54 is positioned over the rear wheel of the bicycle. The rear end 24 of each first rod 12 is inserted into an associated tube 64, and then the handlebar clamps 48 are coupled to the handlebar, positioning the panel 16 over the rider.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A shielding canopy assembly comprising:
   a pair of first rods, each first rod being arcuate;
   a plurality of second rods, each second rod being coupled to and extending between the first rods such that the first rods define an arch;
   a panel coupled to and extending between the pair of first rods, the panel being substantially water impermeable;
   a pair of first couplers, each first coupler being coupled to a front end of a respective first rod, the first couplers being configured for coupling to a handlebar of a bicycle wherein the pair of first couplers is configured for coupling the pair of first rods to the handlebar;
   a pair of second couplers, each second coupler being coupled to a rear end of a respective first rod, the second couplers being configured for coupling to the bicycle behind a seat of the bicycle such that the arch is disposed over a rider positioned on the seat wherein the panel is configured for shielding the rider from the elements; and
   a rack coupled to and positioned between the pair of second couplers and the pair of first rods such that a horizontal section of the rack is positioned over a rear wheel of the bicycle wherein the horizontal section is positioned for stowing the pair of first rods, the plurality of second rods, and the panel.

2. The assembly of claim 1, further including each first rod being tubular.

3. The assembly of claim 1, further comprising:
the pair of first rods comprising plastic;
the plurality of second rods comprising aluminum; and
the panel comprising at least one of an aliphatic polyamide, a semi-aromatic polyamide, and a polyester such that the panel is substantially water impermeable.

4. The assembly of claim 1, further including each second rod having a respective length such that the plurality of second rods comprises second rods having a variety of lengths, the second rods being positioned on the pair of first rods such that the front ends of the pair of first rods are further separated than the rear ends.

5. The assembly of claim 1, further including each second rod comprising a plurality of nested sections such that the second rod is selectively extensible wherein the plurality of nested sections is selectively positionable in an extended configuration wherein the first rods are distally disposed and a retracted configuration wherein the first rods are proximally disposed.

6. The assembly of claim 5, further comprising:
the plurality of nested sections comprising an inner segment selectively extensible from an outer segment;
a plurality of first connectors, each first connector being coupled to a respective inner segment distal from an associated first rod to which the inner segment is coupled; and
a plurality of second connectors, each second connector being coupled to a respective outer segment distal from an associated first rod to which the respective outer segment is coupled, the second connector being complementary to a first connector of an associated inner segment wherein the second connector is positioned for selectively coupling to the first connector for fixedly positioning the respective outer segment relative to the associated inner segment for fixedly positioning the plurality of nested sections in the extended configuration.

7. The assembly of claim 6, further including the second connector comprising a hole, the first connector comprising a segment pin, the segment pin being spring-loaded wherein the segment pin is positioned for inserting into the hole for coupling the respective outer segment to the associated inner segment.

8. The assembly of claim 1, further including the panel comprising a front section, a medial section, and a rear section, the front section and the rear section being substantially transparent wherein the front section and the rear section are configured for allowing the rider to see through the panel.

9. The assembly of claim 1, further including each first coupler comprising a handlebar clamp, the handlebar clamp being C-shaped wherein the handlebar clamp is configured for inserting the handlebar such that the handlebar clamp frictionally couples to the handlebar.

10. The assembly of claim 1, further including the horizontal section comprising a pair of side bars and a plurality of crossbars, each crossbar being coupled to and extending between the side bars.

11. The assembly of claim 1, further including the rack comprising:
a pair of brackets, each bracket being coupled to and extending between a respective opposing side of the horizontal section and an associated second coupler; and
a pair of tubes, each tube being coupled to and extending perpendicularly from a respective front corner of the horizontal section wherein the tube is positioned for inserting a respective first rod for coupling the respective first rod to the rack.

12. The assembly of claim 11, further including each bracket comprising a pair of bars, each bar being coupled to and extending transversely between a respective opposing end of the horizontal section and an associated second coupler.

13. The assembly of claim 11, further comprising:
a pair of first fasteners, each first fastener being coupled to a respective first rod proximate to the front end of the respective first rod; and
a pair of second fasteners, each second fastener being coupled to a respective tube, the second fasteners being complementary to the first fasteners wherein each second fastener is positioned for selectively coupling to an associated first fastener for removably coupling the pair of first tubes to the rack.

14. The assembly of claim 13, further including each second fastener comprising a plurality of orifices, each first fastener comprising a rod pin wherein the rod pin is positioned for selectively inserting into a respective orifice for selectively positioning the arch relative to a head of the rider.

15. The assembly of claim 13, further comprising:
a horizontal rod coupled to and extending from the rack toward a seat post of the bicycle; and
a post clamp coupled to the horizontal rod distal from the rack, the post clamp being C-shaped wherein the post clamp is configured for inserting the seat post of the bicycle such that the post clamp frictionally couples to the seat post wherein the horizontal rod is configured for stabilizing the rack.

16. The assembly of claim 15, further including the horizontal rod comprising a pair of first sections and a second section, each first section being coupled to and extending transversely from a respective tube, the second section being coupled to each of the first sections distal from the pair of tubes such that the pair of first sections is V-shaped.

17. A shielding canopy assembly comprising:
a pair of first rods, each first rod being arcuate;
a plurality of second rods, each second rod being coupled to and extending between the first rods such that the first rods define an arch;
a panel coupled to and extending between the pair of first rods, the panel being substantially water impermeable;
a pair of first couplers, each first coupler being coupled to a front end of a respective first rod, the first couplers being configured for coupling to a handlebar of a bicycle wherein the pair of first couplers is configured for coupling the pair of first rods to the handlebar;
a pair of second couplers, each second coupler being coupled to a rear end of a respective first rod, the second couplers being configured for coupling to the bicycle behind a seat of the bicycle such that the arch is disposed over a rider positioned on the seat wherein the panel is configured for shielding the rider from the elements; and
each second coupler comprising an axle clamp, the axle clamp being C-shaped wherein the axle clamp is configured for inserting a respective rear wheel coupler of the bicycle such that the axle clamp frictionally couples to the respective rear wheel coupler.

18. A shielding canopy assembly comprising:
a pair of first rods, each first rod being arcuate, each first rod being tubular, the pair of first rods comprising plastic;
a plurality of second rods, each second rod being coupled to and extending between the first rods such that the first rods define an arch, each second rod having a respective length such that the plurality of second rods comprises second rods having a variety of lengths, the second rods being positioned on the pair of first rods such that front ends of the pair of first rods are further separated than rear ends, the plurality of second rods comprising aluminum, each second rod comprising a plurality of nested sections such that the second rod is selectively extensible wherein the plurality of nested sections is selectively positionable in an extended configuration wherein the first rods are distally disposed and a retracted configuration wherein the first rods are proximally disposed, the plurality of nested sections comprising an inner segment selectively extensible from an outer segment;
a plurality of first connectors, each first connector being coupled to a respective inner segment distal from an associated first rod to which the inner segment is coupled;
a plurality of second connectors, each second connector being coupled to a respective outer segment distal from an associated first rod to which the respective outer segment is coupled, the second connector being complementary to a first connector of an associated inner segment wherein the second connector is positioned for selectively coupling to the first connector for fixedly positioning the respective outer segment relative to the associated inner segment for fixedly positioning the plurality of nested sections in the extended configuration, the second connector comprising a hole, the first connector comprising a segment pin, the segment pin being spring-loaded wherein the segment pin is positioned for inserting into the hole for coupling the respective outer segment to the associated inner segment;
a panel coupled to and extending between the pair of first rods, the panel being substantially water impermeable, the panel comprising a front section, a medial section, and a rear section, the front section and the rear section being substantially transparent wherein the front section and the rear section are configured for allowing the rider to see through the panel, the panel comprising at least one of an aliphatic polyamide, a semi-aromatic polyamide, and a polyester such that the panel is substantially water impermeable;
a pair of first couplers, each first coupler being coupled to the front end of a respective first rod, the first couplers being configured for coupling to a handlebar of a bicycle wherein the pair of first couplers is configured for coupling the pair of first rods to the handlebar, each first coupler comprising a handlebar clamp, the handlebar clamp being C-shaped wherein the handlebar clamp is configured for inserting the handlebar such that the handlebar clamp frictionally couples to the handlebar;
a pair of second couplers, each second coupler being coupled to the rear end of a respective first rod, the second couplers being configured for coupling to the bicycle behind a seat of the bicycle such that the arch is disposed over a rider positioned on the seat wherein the panel is configured for shielding the rider from the elements, each second coupler comprising an axle clamp, the axle clamp being C-shaped wherein the axle clamp is configured for inserting a respective rear wheel coupler of the bicycle such that the axle clamp frictionally couples to the respective rear wheel coupler;
a rack coupled to and positioned between the pair of second couplers and the pair of first rods such that a horizontal section of the rack is positioned over a rear wheel of the bicycle wherein the horizontal section is positioned for stowing the pair of first rods, the plurality of second rods, and the panel, the horizontal section comprising a pair of side bars and a plurality of crossbars, each crossbar being coupled to and extending between the side bars, the rack comprising:
  a pair of brackets, each bracket being coupled to and extending between a respective opposing side of the horizontal section and an associated second coupler, each bracket comprising a pair of bars, each bar being coupled to and extending transversely between a respective opposing end of the horizontal section and an associated second coupler, and
  a pair of tubes, each tube being coupled to and extending perpendicularly from a respective front corner of the horizontal section wherein the tube is positioned for inserting a respective first rod for coupling the respective first rod to the rack;
a pair of first fasteners, each first fastener being coupled to a respective first rod proximate to the front end of the respective first rod;
a pair of second fasteners, each second fastener being coupled to a respective tube, the second fasteners being complementary to the first fasteners wherein each second fastener is positioned for selectively coupling to an associated first fastener for removably coupling the pair of first tubes to the rack, each second fastener comprising a plurality of orifices, each first fastener comprising a rod pin wherein the rod pin is positioned for selectively inserting into a respective orifice for selectively positioning the arch relative to a head of the rider;
a horizontal rod coupled to and extending from the rack toward a seat post of the bicycle, the horizontal rod comprising a pair of first sections and a second section, each first section being coupled to and extending transversely from a respective tube, the second section being coupled to each of the first sections distal from the pair of tubes such that the pair of first sections is V-shaped; and
a post clamp coupled to the horizontal rod distal from the rack, the post clamp being C-shaped wherein the post clamp is configured for inserting the seat post of the bicycle such that the post clamp frictionally couples to the seat post wherein the horizontal rod is configured for stabilizing the rack.

* * * * *